(12) United States Patent
Lee et al.

(10) Patent No.: US 8,648,970 B2
(45) Date of Patent: Feb. 11, 2014

(54) REMOTE CONTROLLABLE VIDEO DISPLAY SYSTEM AND CONTROLLER AND METHOD THEREFOR

(75) Inventors: Chin-Chou Lee, HsinChu (TW); Chun-Huang Lin, HsinChu (TW); Jeng-Feng Lan, HsinChu (TW); Yu-Wei Tsai, HsinChu (TW)

(73) Assignee: Chip Goal Electronics Corporation, ROC, Hsin-Chu (TW)

( * ) Notice: Subject to any disclaimer, the term of this patent is extended or adjusted under 35 U.S.C. 154(b) by 863 days.

(21) Appl. No.: 12/848,505

(22) Filed: Aug. 2, 2010

(65) Prior Publication Data

US 2012/0026408 A1    Feb. 2, 2012

(51) Int. Cl.
*H04N 5/44* (2011.01)
(52) U.S. Cl.
USPC ..... 348/734; 348/552; 348/14.05; 348/14.02; 345/156
(58) Field of Classification Search
USPC ............. 348/734, 552, 14.05, 114, 14.02; 345/169, 158, 156; 340/426.13, 4.62, 340/5.61; 725/81, 133
See application file for complete search history.

(56) References Cited

U.S. PATENT DOCUMENTS

| | | | |
|---|---|---|---|
| 8,341,318 B2* | 12/2012 | Holden et al. | 710/72 |
| 2007/0152968 A1* | 7/2007 | Cheng | 345/163 |

* cited by examiner

*Primary Examiner* — Jefferey Harold
*Assistant Examiner* — Jean W Desir
(74) *Attorney, Agent, or Firm* — Tung & Associates

(57) ABSTRACT

The present invention discloses a remote controllable video display system and a controller therefor, wherein positional information is generated by a sensor according to light from a light source. The controller includes a button with a predetermined function, wherein when the button is pressed or released, the status of the button (pressed or released) is outputted but (i) the positional information is not outputted or not processed within a predetermined period of time; or (ii) the positional information is not outputted or not processed when the remote controller has an acceleration larger than a predetermined value. Or, when the button is pressed once, the controller outputs double-click or multiple-click action information.

54 Claims, 8 Drawing Sheets

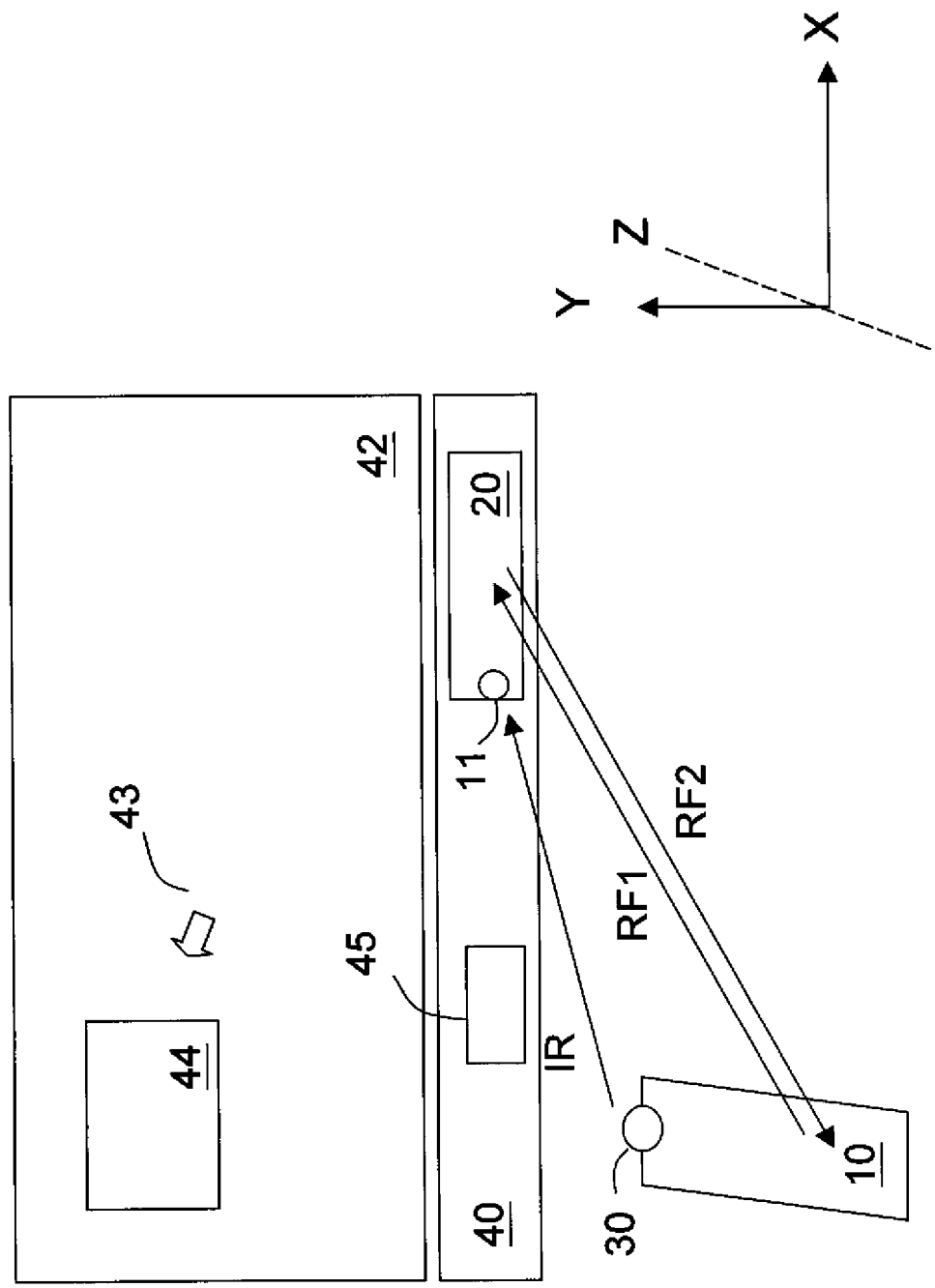

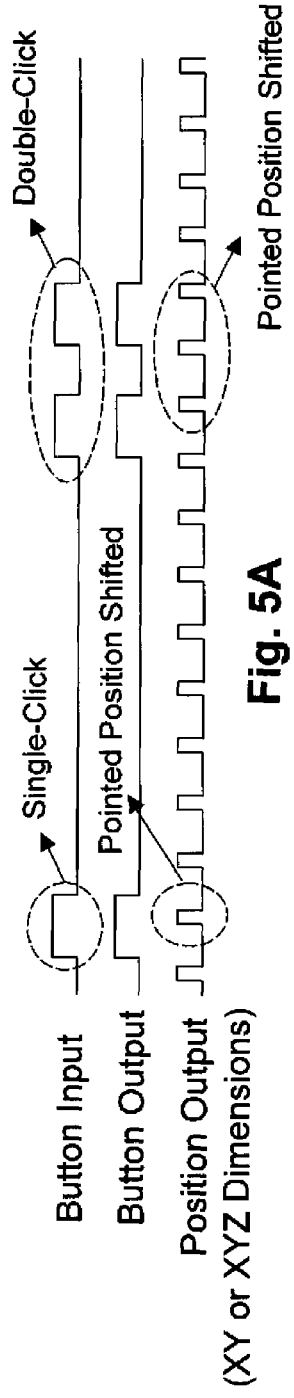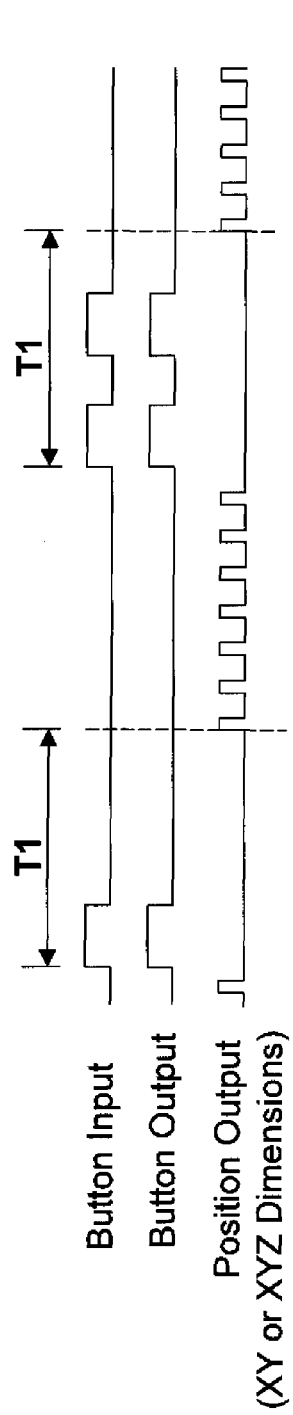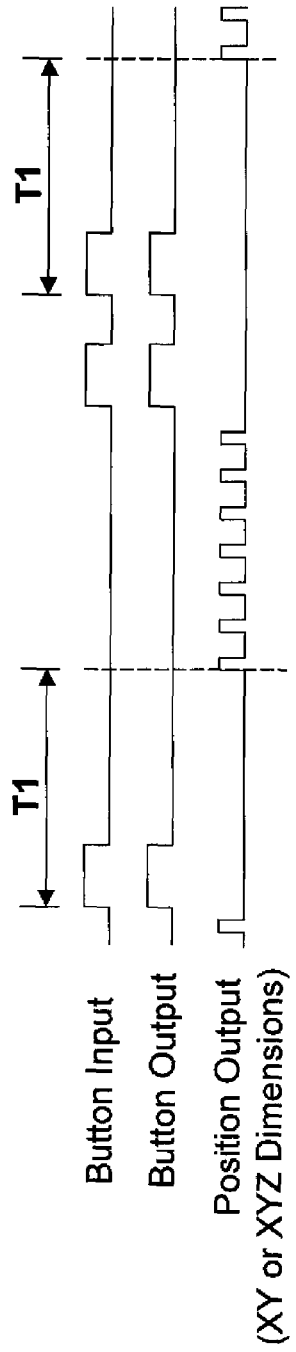
Fig. 5A
Fig. 5B
Fig. 5C

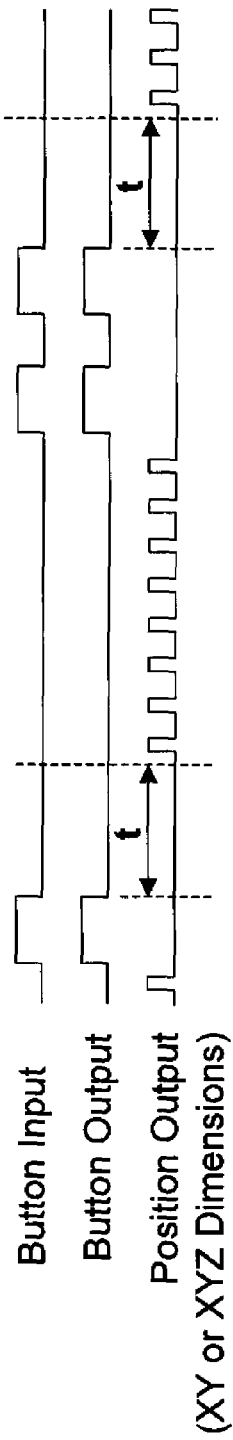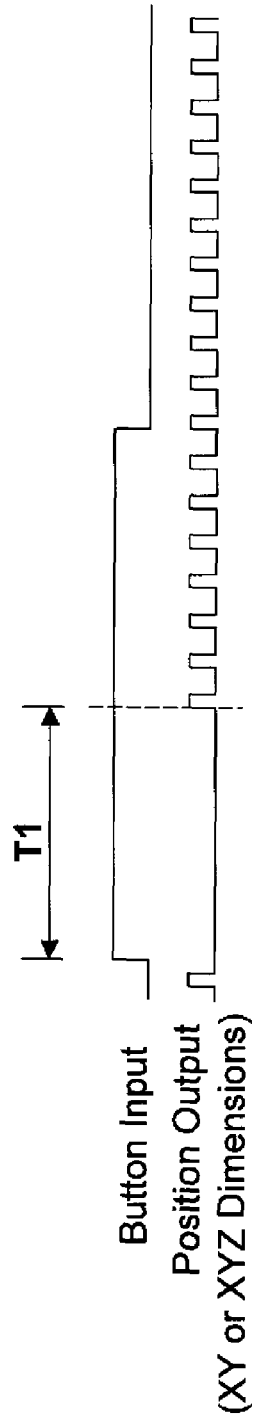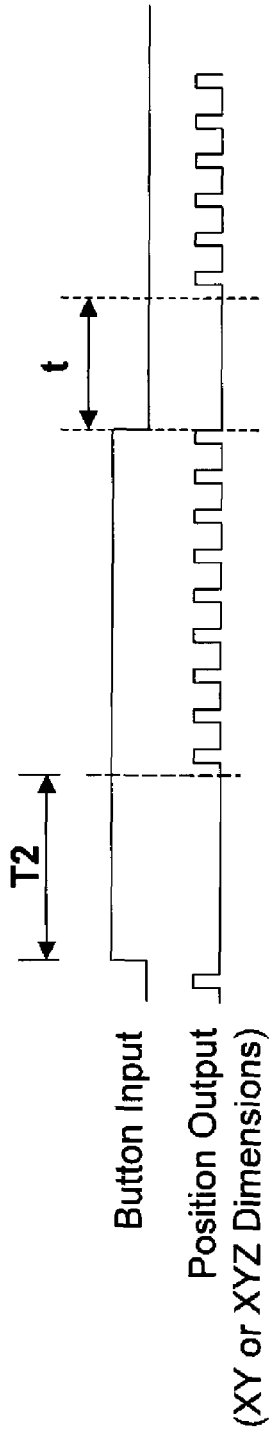

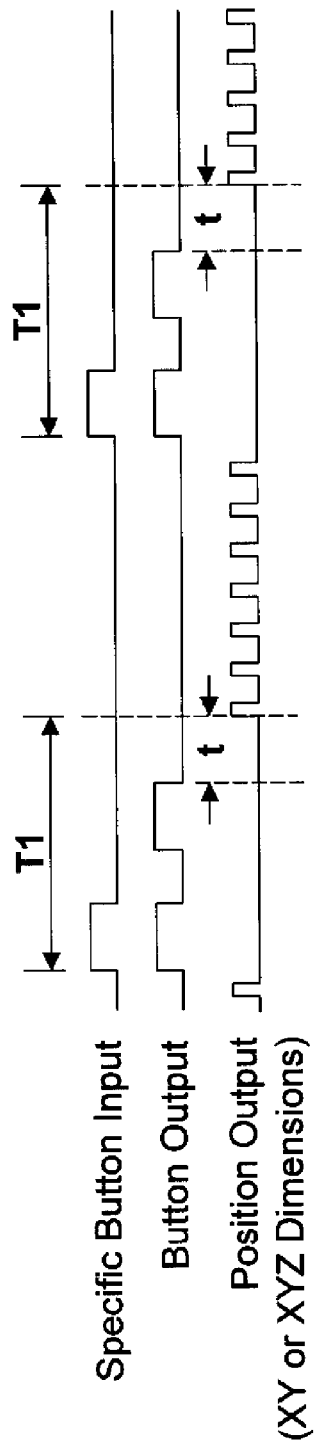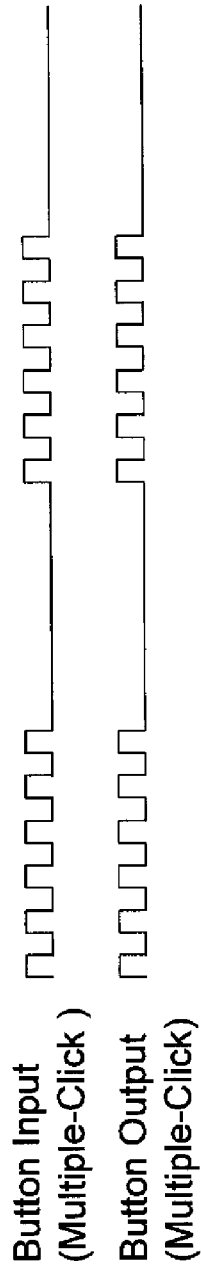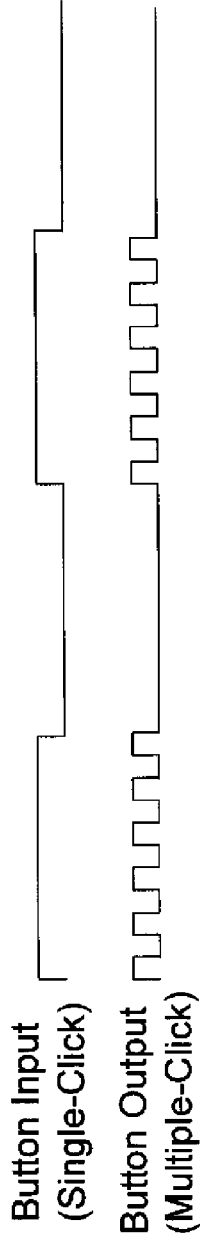

REMOTE CONTROLLABLE VIDEO DISPLAY SYSTEM AND CONTROLLER AND METHOD THEREFOR

BACKGROUND OF THE INVENTION

1. Field of Invention

The present invention relates to a remote controllable video display system, a controller for a remote controllable video display system, and a method for remote controlling a video display system.

2. Description of Related Art

Conventionally, a remote controller for a video display system, such as a television or a video recorder, can only transmit simple instructions such as power-on, power-off, channel switching, or volume adjustment to a video display host. The prior art remote controller for video display system does not provide a function similar to a computer mouse, such as controlling cursor movement on a screen, or pointing to an icon on the screen to select it or to trigger a desired function. Another disadvantage is that there is only single-directional wireless transmission between the conventional remote controller and the video display host; the remote controller can not interact with the video display host bi-directionally. That is, the remote controller can transmit information to the video display host, but the video display host can not transmit information to the remote controller.

In view of the foregoing drawbacks, the present invention provides a remote controllable video display system, wherein a user can control cursor movement or select an icon on a screen by moving a remote controller three-dimensionally. Because the remote controller is moved three-dimensionally (unlike the computer mouse which is moved two-dimensionally on a desk), it is more likely for the remote controller to move unintentionally and deviate from the desired position when a user presses a button thereon. As such, the present invention provides a solution to the foregoing problem. In addition, the remote controller according to present invention provides a double-click function, so that different instructions can be generated and transmitted by single-clicking or double-clicking the same button. Further, in the remote controllable video display system, the user can interact with the video display host via the remote controller. Furthermore, the present invention also provides a method for controlling a remote controllable video display system with bi-directional communication between the video display host and the remote controller.

SUMMARY OF THE INVENTION

A first objective of the present invention is to provide a remote controllable video display system.

Another objective of the present invention is to provide a remote controller for a remote controllable video display system A further objective of the present invention is to provide a method for remote controlling a video display system.

To achieve the foregoing objectives, in one perspective of the present invention, it provides a remote controllable video display system comprising:

(I): (1) a video display host; (2) a light source for emitting a light signal; (3) a remote controller movable three-dimensionally for generating control information, including: (3a) an optical sensor for sensing the light signal to detect a relative position of the optical sensor to the light source, and generating a first electronic signal representing positional information; (3b) a signal processor and transceiver for receiving and processing the first electronic signal to transmit a first wireless signal; and (3c) a first button with a predetermined function; and (4) a receiver device coupled to the video display host, the receiver device receiving the first wireless signal and generating a second electronic signal which is inputted to the video display host, or (II): (1) a video display host; (2) a remote controller movable three-dimensionally for generating control information, including: (2a) a light source for emitting a light signal; (2b) a signal processing and transmitting device for transmitting a first wireless signal; and (2c) a first button with a predetermined function; (3) an optical sensor for sensing the light signal to detect a relative position of the optical sensor to the light source, and generating a first electronic signal representing positional information; and (4) a receiver device coupled to the video display host, the receiver device receiving the first electronic signal and the first wireless signal, and generating a second electronic signal which is inputted to the video display host.

In the foregoing structure (I) or (II), when the first button is pressed or released, action information about the status of the first button (pressed or released) is outputted, but (i) the positional information is not outputted or not processed within a predetermined period of time, or (ii) the positional information is not outputted or not processed when the remote controller has an acceleration larger than a predetermined value.

In another perspective of the present invention, it provides a remote controller for a remote controllable video display system, which is movable three-dimensionally to generate control information for remote controlling a video display host, the remote controller comprising: (1) an optical sensor for sensing a light signal from a light source to detect a relative position of the remote controller to the light source, and generating a first electronic signal representing positional information; (2) a signal processing and transmitting device for receiving and processing the first electronic signal to transmit a first wireless signal; and (3) a first button with a predetermined function, wherein when the first button is pressed or released, action information about the status of the first button (pressed or released) is outputted, but (i) the positional information is not outputted or not processed within a predetermined period of time, or (ii) the positional information is not outputted or not processed when the remote controller has an acceleration larger than a predetermined value.

In another perspective of the present invention, it provides a remote controller for a remote controllable video display system, which is movable three-dimensionally to generate control information for remote controlling a video display host, the remote controller comprising: (1) an optical sensor for sensing a light signal from a light source to detect a relative position of the remote controller to the light source, and generating a first electronic signal representing positional information; (2) a signal processing and transmitting device for receiving the first electronic signal, and transmitting a first wireless signal, the first wireless signal including the control information; and (3) a first button with a predetermined function, wherein the remote controller outputs double-click or multiple-click action information when the first button is pressed once.

In yet another perspective of the present invention, it provides a method for remote controlling a video display system, comprising: emitting a light signal from a first remote end; sensing the light signal from a second remote end for detecting a relative position of the first remote end to the second remote end, and generating a first electronic signal representing positional information; moving one of the first and the second remote ends three-dimensionally, to change the positional information and generate control information for controlling a video display host; providing a button with a predetermined function on one of the first and second remote ends which is being moved three-dimensionally; and outputting action information about a status of the button when the button is pressed or released, but (i) stopping generating the positional information or stopping controlling the video display host by the positional information within a predetermined period of time, or (ii) stopping generating the positional information or stopping controlling the video display host by the positional information, when one of the first or second remote ends which is being moved has an acceleration larger than a predetermined value.

In the foregoing remote controllable video display system, the remote controller for the remote controllable video display system, or the method for remote controlling the video display system, the control information for example can be used for controlling a controllable object shown in a graphic displayed on the display device, to move the controllable object or to trigger a particular function.

In the foregoing remote controllable video display system, or the remote controller for the remote controllable video display system, through bi-directional communication, information such as an audio signal or a search signal can be transmitted from the video display host to the remote controller. A speaker or microphone can be built in the remote controller so that the remote controller becomes an Internet phone, or to provide a voice control function such that a user can control the video display host by sound or voice. In another embodiment, the remote controller can be used as a baby monitor camera which transmits a captured image to a display device of the video display system.

In addition, a multiple-click button can be provided on the remote controller, wherein when the multiple-click button is pressed, the remote controller outputs multiple-click action information. This multiple-click button can be the same button with the predetermined function, or another button.

The objectives, technical details, features, and effects of the present invention will be better understood with regard to the detailed description of the embodiments below, with reference to the drawings.

BRIEF DESCRIPTION OF THE DRAWINGS

FIG. 3 shows the interactions among and the operations of a remote controller, a receiver device, a video display host, and a display device in a second embodiment of the present invention.

FIG. 5A shows that it would be less preferred if positional information and action information about the status of the button (pressed or released) are outputted simultaneously.

FIG. 5B shows one solution proposed by the present invention to solve the problem shown in FIG. 5A.

FIG. 5C shows another solution proposed by the present invention to solve the problem shown in FIG. 5A.

FIG. 5D shows yet another solution proposed by the present invention to solve the problem shown in FIG. 5A.

FIGS. 5E-5F shows that if the button is kept pressed longer than a predetermined time threshold, the positional information is outputted although the button is still in a pressed status.

FIG. 5G shows that a specific button is provided for outputting double-click action information when the button is click once.

FIG. 6A shows a conventional way to generate multiple-click action information.

FIG. 6B shows an embodiment of the present invention wherein multiple-click action information is generated by keeping the button in a pressed status.

DESCRIPTION OF THE PREFERRED EMBODIMENTS

Figure 1:
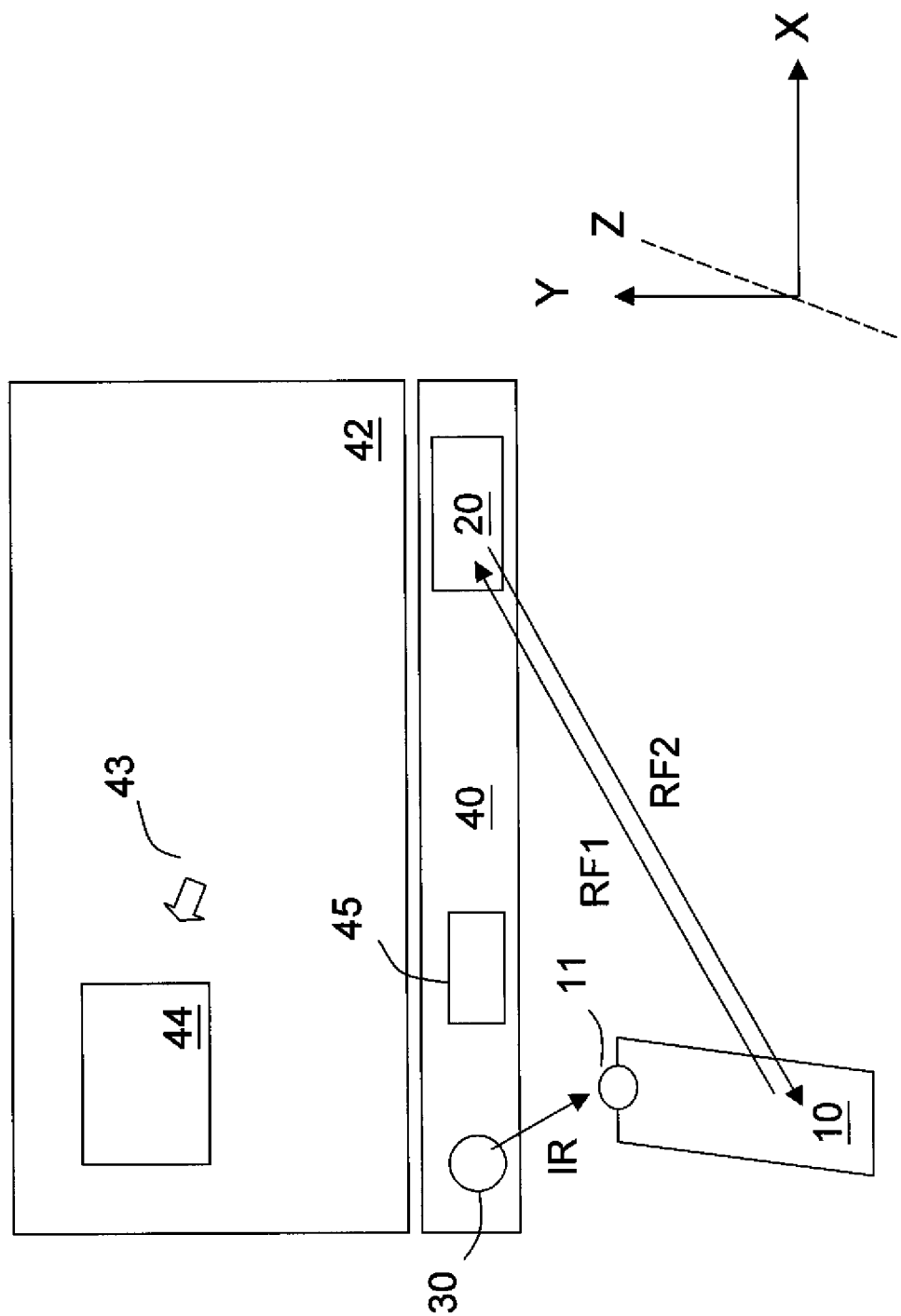
FIG. 1 shows the interactions among and the operations of a remote controller, a receiver device, a video display host, and a display device in a first embodiment of the present invention.

Please refer to the schematic diagram of FIG. 1 for the first embodiment of the present invention. As shown in the drawing, in this embodiment, a remote controllable video display system includes: a remote controller 10, a transceiver device 20, a light source 30, and a video display host 40. Typically, the remote controllable video display system also includes a screen 42, but it can be other display device instead, such as a projector device, a wearable display device, etc. The transceiver device 20 and the light source 30 can be built in the video display host 40, or connected externally. The remote controllable video display system for example can be a television, a video recorder/player, a hard disc player, an entertainment or game system, etc.

Figure 2B:
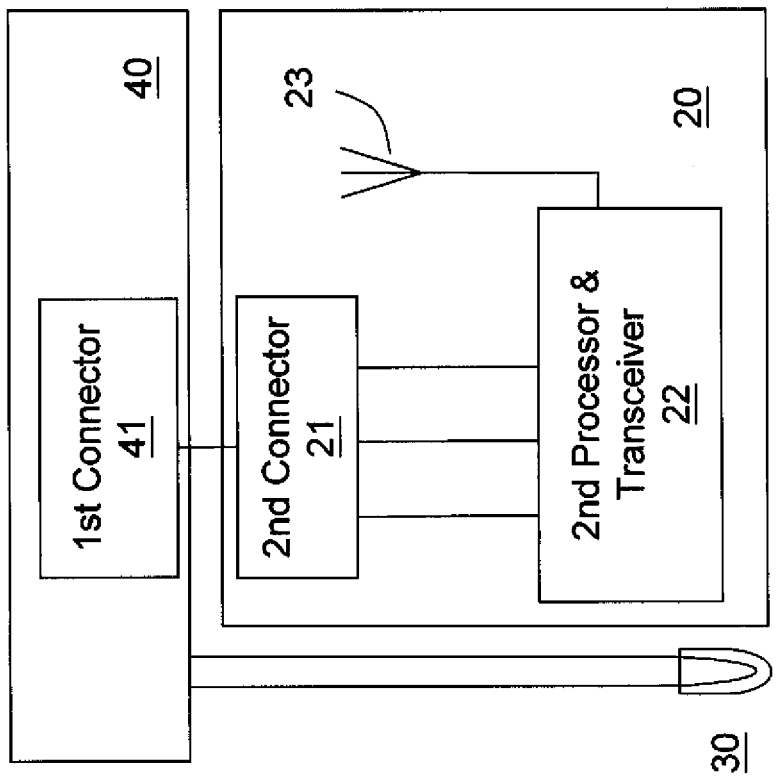
FIG. 2B shows a schematic structure diagram of the receiver device in the first embodiment.
Figure 2A:
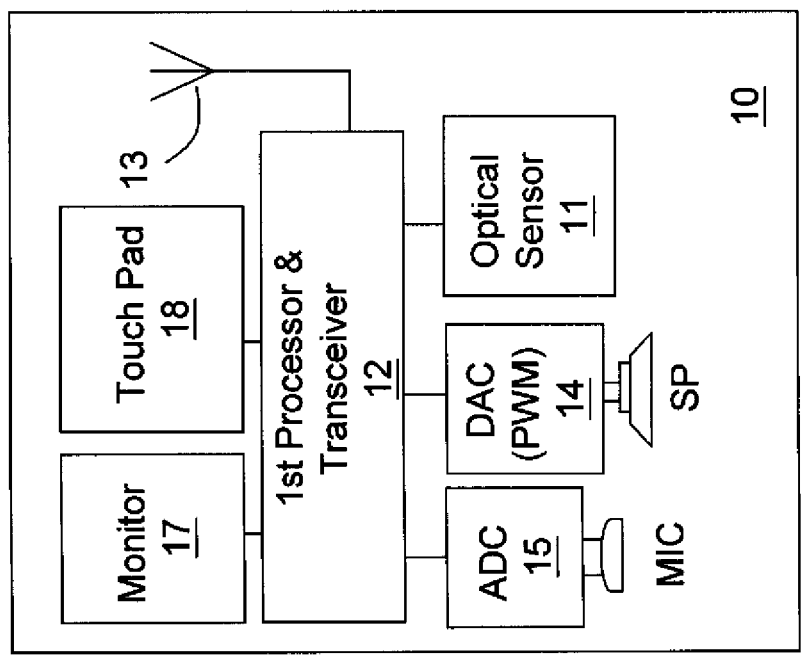
FIG. 2A shows a schematic structure diagram of the remote controller in the first embodiment.

In this embodiment, the remote controller 10 has an internal structure shown schematically in FIG. 2A, including an optical sensor 11, a first processor and transceiver 12, and a first antenna 13. FIG. 2B schematically shows the internal structure of the transceiver device 20, including: a second processor and transceiver 22, a second antenna 23, and a second connector 21. Note that the first processor and transceiver 12 is not necessarily integrated into one single circuit, but can be separate circuits such as one signal processor and one transceiver; the same for the second processor and transceiver 22. In certain applications, it is not required for the transceiver device 20 to transmit signals to the remote controller 10; in this case the transceiver device 20 can be just a receiver device instead, and the second processor and transceiver 22 can be replaced by a receiver without a function to transmit, and the first processor and transceiver 12 can be replaced by a transmitter without a function to receive.

Referring to FIGS. 1, 2A, and 2B, the system according to this embodiment operates in the following way: First, the light source 30 emits alight signal, such as an infrared (IR) signal. Next, the optical sensor 11 senses the light signal to detect a relative position of the optical sensor to the light source, that is, a relative position of the remote controller to the light source, wherein the positional information can be two-dimensional information (x and y directions in FIG. 1) or three-dimensional information (x, y, and z directions in FIG. 1). The optical sensor 11 generates a first electronic signal representative of the positional information according to the sensed light signal, and transmits the first electronic signal to the first processor and transceiver 12. The first processor and transceiver 12 processes the first electronic signal to convert it to a first wireless signal RF1 and transmits the wireless signal RF1 to the transceiver device 20 via the first antenna 13. In the transceiver device 20, after the second antenna 23 receives the first wireless signal RF1 from the remote controller 10, the second processor and transceiver 22 converts it to a second electronic signal, which is transmitted to the video display host 40 via a second and a first connectors 21 and 41. If the transceiver device 20 is built in the video display host 40, the first and second connectors 41 and 21 are not required.

Figure 4B:
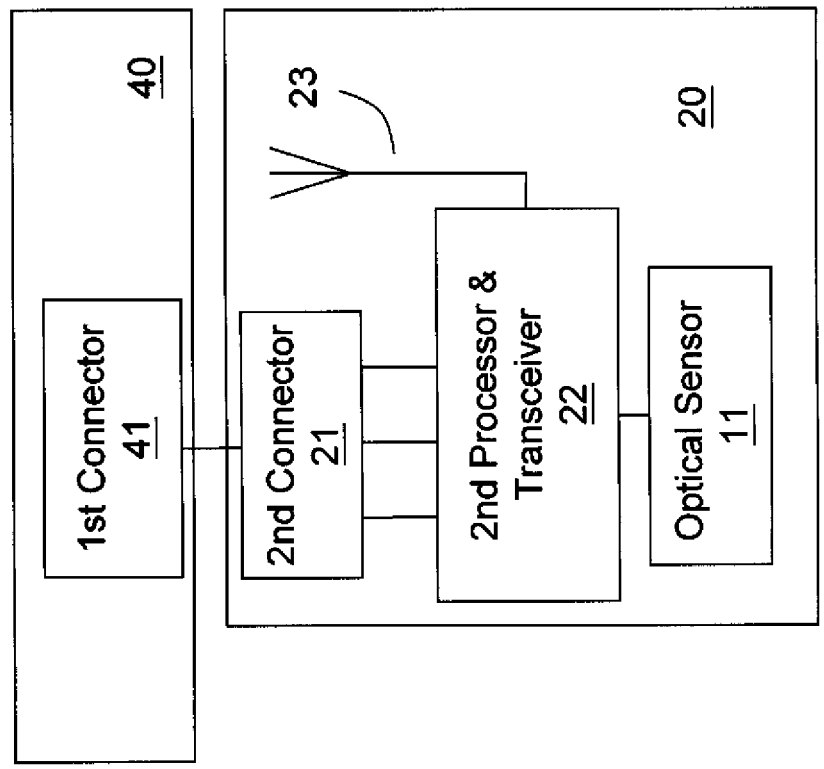
FIG. 4B shows a schematic structure diagram of the receiver device in the second embodiment.
Figure 4A:
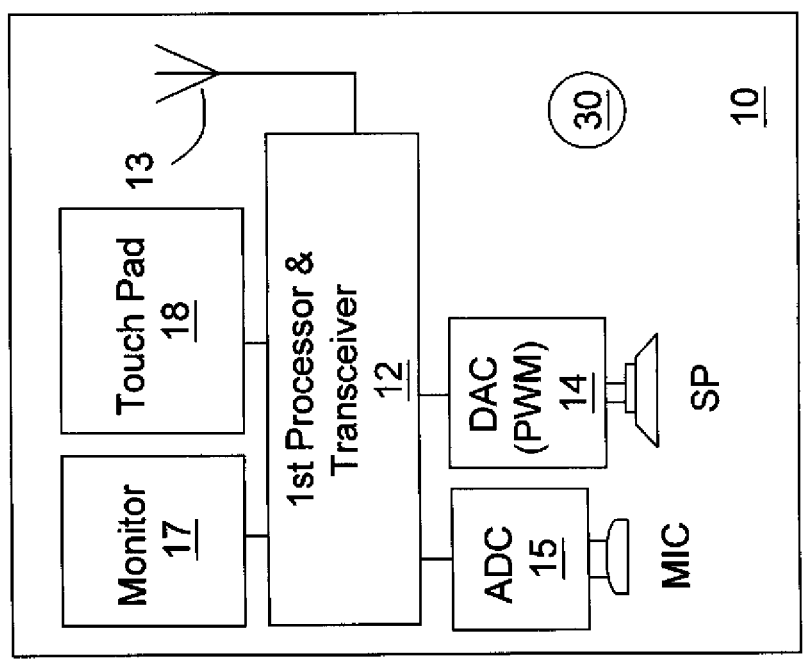
FIG. 4A shows a schematic structure diagram of the remote controller in the second embodiment.

FIG. 3 shows another embodiment of the present invention, wherein the light source 30 is provided in the remote controller 10, and the optical sensor 11 is provided in the transceiver device 20. Corresponding circuitry of the remote controller 10 and the transceiver device 20 are shown in FIGS. 4A and 4B, respectively. Note that in FIG. 4A, the light source 30 needs not connect with any circuit in the remote controller 10. The advantage of this embodiment is that because the positional information is determined and processed in the second processor and transceiver 22, the first processor and transceiver in the remote controller 10 can be simpler and the amount of data transmitted from the remote controller 10 to the transceiver device 20 is fewer.

In one application of the present invention, control information can be generated by moving the remote controller 10 three-dimensionally, for example to control a cursor 43 or any other controllable object to select an icon 44 displayed on the screen 42 (or any other type of display device). As mentioned earlier, the positional information of the remote controller relative to the light source can be obtained in the present invention. Hence, a displacement, velocity, or acceleration of the movement of the remote controller 10 can be calculated according to the positional information at different time points, and a time difference therebetween. The foregoing calculation can be performed in the first processor and transceiver 12, the second processor and transceiver 22, or the video display host 40. According to the present invention, the screen 42 can be a full HD resolution screen. In addition, the controllable object is not limited to a pointing symbol such as the cursor or the like, but can be any type of controllable object, such as a human character in a game or a weapon used by the human character.

In the present invention, a user can use one or more buttons in the remote controller 10 to perform various predetermined functions, such as: clicking an icon 44 to initiate a software program or to trigger a function, or selecting a controllable object and dragging it to a desired position by pressing the button and moving the remote controller 10, wherein single-clicking and double-clicking the same button can generate different control information to trigger different functions. (Certainly it is also possible to assign other different meanings to more than two clicks. Hereinafter, three or more continuous clicks is referred to as "multiple-click"). Note that the present invention functions in a different way from a general mouse; more specifically, unlike a general mouse which is moved on a desk two-dimensionally, the remote controller 10 is moved three-dimensionally. Hence, when a user presses down a button on the remote controller 10, the positional information of the remote controller 10 may very likely be changed. Yet, in different circumstances, the user may desire to output the positional information (for example, when the controllable object is being dragged to a new position), or not to output the positional information to avoid deviation of a position that is being pointed to (for example, when the user single-clicks or double-clicks a button to trigger a certain function). As such, a solution to distinguish the different circumstances is required.

Referring to FIG. 5A, the "position output" waveform represents the positional information (x and y, or x, y, and z dimensional information) outputted according to a clock frequency, and the "button output" waveform represents action information about the status of the button (pressed or released). Action information typically includes single-click and double-click; yet, it may further include multiple-click according to the present invention. As shown in the drawing, if the action information about the status of the button (pressed or released) and positional information are outputted simultaneously, the controllable object may shift from its original position that is being pointed to.

In view of the foregoing problem, the present invention provides several solutions below:

First Solution

Please refer to FIGS. 5B-5D for the first solution. When the button is pressed, the "action information" about the status of being pressed or released (single-click, double-click, or multiple-click) is outputted, but the circuit or system does not output the positional information. The foregoing solution for example can be embodied by one of the following ways: (a) disabling the optical sensor 11; (b) the optical sensor 11 still operates, but the first or second processor and transceiver 12 or 22 stops processing the first electronic signal generated by the optical sensor 11; (c) the remote controller 10 stops transmitting the positional information to the transceiver device 20 in the embodiment shown in FIG. 1; (d) the positional information is still outputted, but not processed (for example, the controllable object is not moved according to the positional information). FIG. 5B shows an embodiment wherein the positional information is not outputted (or is outputted but not processed) within a predetermined threshold period T1 after the button is first pressed. FIG. 5C shows another embodiment wherein the positional information is not outputted (or is outputted but not processed) within a predetermined threshold period T1 after the button is last pressed. FIG. 5D shows yet another embodiment wherein the positional information is not outputted (or is outputted but not processed) within a predetermined threshold period t after the button is last released. Although the embodiments in FIGS. 5B-5D are different in the calculation of the threshold periods, they all belong to the same concept of the present invention.

In the foregoing embodiments shown in FIGS. 5B and 5C, if a user desires to output the positional information when the button is pressed (for example, when the user intends to drag a controllable object), as shown in FIG. 5E, the positional information can be outputted by pressing the button longer than the predetermined threshold period T1, such that the positional information can be outputted while the button is still pressed.

In the foregoing embodiment shown in FIG. 5D, if a user desires to output the positional information when the button is pressed, as shown in FIG. 5F, another threshold period T2 can be predetermined in the system. More specifically, the positional information is outputted when the button is kept being pressed longer than the predetermined threshold period T2.

Second Solution

The second solution is thus. When the button is pressed, the first or second processor and transceiver 12 and 22 (or an additional calculation circuit) calculates an acceleration of the remote controller 10. If the acceleration of the remote controller 10 is higher than a predetermined threshold, it probably indicates that the user intends to press the button but does not intend to move the controllable object. In this case, the positional information is not outputted, or the positional information is outputted but not processed, and only the button output (action information) is processed. On the contrary, if the acceleration of the remote controller 10 is lower than the predetermined threshold, the positional information is outputted and processed. In this solution, it is not required to calculate the predetermined threshold period after the button is pressed or released. If the user intends to drag the controllable object, he can press the button with a smaller force and move the remote controller 10, such that the system will keep outputting (and processing) the positional information.

Third Solution

Please refer to FIG. 5G for the third solution. In general, a displacement of the remote controller 10 caused by single-click is smaller, but it is higher when the button is double-clicked or multiple-clicked. Therefore, a specific button for double-click can be provided on the remote controller 10, and when the specific button is pressed once, it outputs double-click action information (or multiple-click action information, if so defined). In this solution, if the user intends to drag the controllable object, another button can be provided for such use. The third solution can be employed alone, or employed together with the first and/or second solutions.

In certain applications, it is required to continuously output the pressed status of the button multiple times. In this case, referring to FIG. 6A, if one single-click only generates action information representing that the button is pressed once, the user may be exhausted due to the repetitive actions. Even if one single-click represents double-click as shown in FIG. 5G, the user may still need to press the button multiple times. Thus, as shown in FIG. 6B, according to the present invention, a button may be provided with such function that when this button is kept being pressed, the remote controller 10 outputs multiple times of the action information about the status of the button, until the button is released. For example, when a user is playing a shooting game, the user can keep this button un-released for non-stop shooting to increase the fun of the game. This button can be the same button as those in FIGS. 5B-5G, or another button on the remote controller 10, dedicated for such use.

Referring to FIGS. 1, 2A, and 2B (FIGS. 3, 4A, and 4B as well), in one embodiment of the present invention, the remote controller 10 can receive an external audio signal, and transmit it to the video display host 40 by the first wireless signal RF1. The remote controller 10 receives the audio signal by, for example, providing a microphone MIC in the remote controller 10, or connecting the remote controller 10 with an external microphone MIC; the audio signal received by the microphone MIC is converted to a digital signal by an analog to digital converter (ADC) 15, and the digital signal is processed by the first processor and transceiver 12, and then transmitted to the video display host 40 by the first wireless signal RF1. With such function to receive an audio signal by the microphone MIC, the system can be used for karaoke, or, the audio signal may be used for voice control, such as to control the video display host 40 for power-on, power-off, channel switching, volume adjustment, or the like. In the case of voice control, the system can identify an instruction by voice recognition or other technique, or by simpler methods such as to identify the instruction according to volume, frequency, the number of times that sound is generated, etc.

Figure 7B:
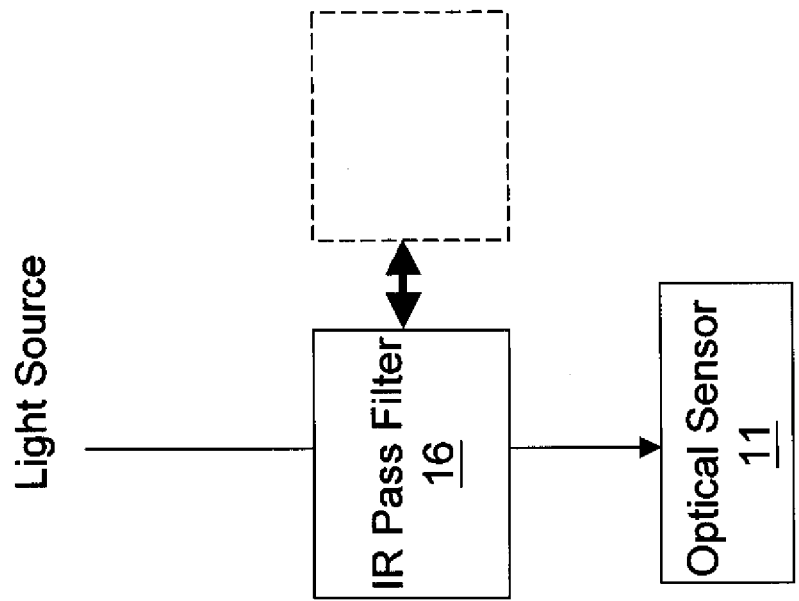
FIGS. 7A and 7B show two embodiments wherein the optical sensor 11 is switchable between receiving an infrared signal and directly receiving a general light signal.
Figure 7A:
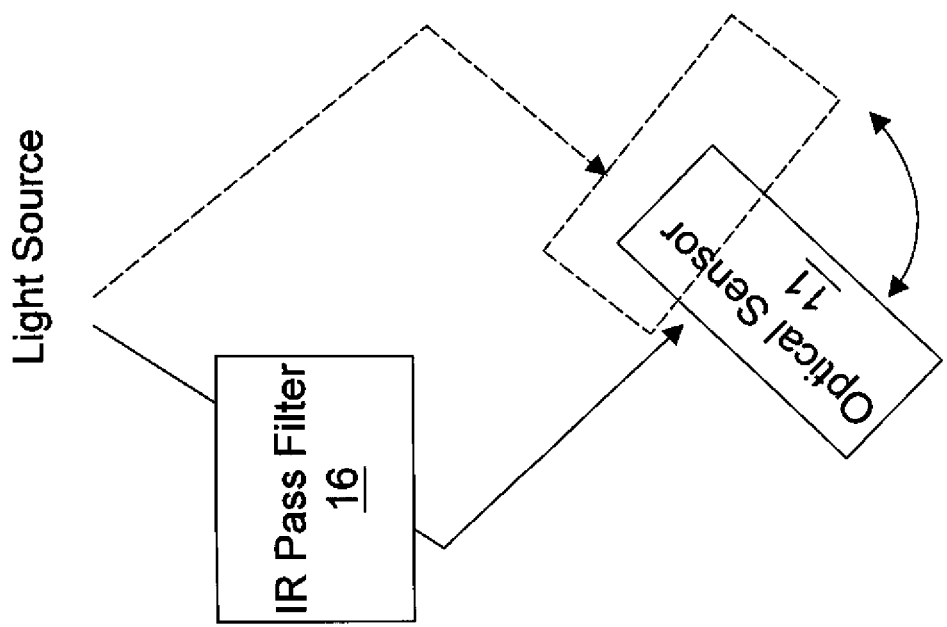

In another embodiment of the present invention, the remote controller 10 can receive an external image and transmit the image to the video display host 40 by the first wireless signal RF1. As such, the remote controller can function as a baby camera; for example, a baby who plays in a playroom can be monitored by parents in a living room. In the embodiments shown in FIGS. 1, 2A, and 2B, it is not required to connect the remote controller 10 to an external image capturing device or to include such additional image capturing device inside the remote controller 10, since the remote controller 10 is provided with the optical sensor 11 already, which can be used for sensing infrared signals and general images. When the baby monitor function is not required, the optical sensor 11 receives light signals through an infrared (IR) pass filter to sense the infrared signal emitted by the light source 30. The IR pass filter for example can be a high pass filter letting through only IR signals but blocking other light signals, or a band pass filter letting through only light signals having the same wavelength as the light source but blocking other light signals. When the monitor function is required, the optical sensor 11 receives general images directly, not through the IR pass filter; or, the optical sensor 11 receives images through other types of filters such as IR cut filter, but not through the high pass filter or band pass filter. The foregoing concept can be embodied for example by the hardware embodiments as shown in FIGS. 7A and 7B, wherein different optical paths are provided (such that the optical sensor 11 can receive light signals through or not through the IR pass filter 16), or the IR pass filter 16 is movable (such that the optical sensor 11 can be covered or not covered by the IR pass filter).

In a further embodiment of the present invention, the video display host 40 transmits information to the remote controller 10 via a second wireless signal RF2 for bi-directional communication. For example, the video display host 40 can transmit music to the remote controller 10 via the second wireless signal RF2, and after the second wireless signal RF2 is converted by the a digital to analog converter circuit (DAC) or a pulse width modulation circuit 14, the music is played via a speaker SP. As such, the user can listen to the music by an earphone or directly from the speaker SP. In addition, the video display host 40 can further include a search button (not shown) for searching the remote controller 10; when the search button is pressed, the video display host 40 transmits a search signal to the remote controller 10, such that the remote controller 10 vibrates, flashes, or plays a sound effect built in the remote controller 10. Concurrently, the video display host 40 can display related information when searching the remote controller 10, for example by providing an additional LED which is flashing, by displaying text or image message on a small size display device 45 (referring to FIG. 1 and FIG. 3) such as an LED array or a small LCD display, or by directly showing text or image message on the screen 42.

In yet another embodiment of the present invention, the video display host 40 can be connected to Internet, and the remote controller 10 communicates with the video display host 40 via the first wireless signal RF1 and the second wireless signal RF2 to function as an Internet phone.

Furthermore, additional functions can be further integrated in the remote controller 10. Referring to FIGS. 2A and 4A, an additional display device 17 can be further included in the remote controller 10, such as a small size LCD display device or an LED array for showing various information, such as: volume, channel, input source (television or video input terminal), etc. In addition, a touch pad 18 can be provided for handwriting input, cursor control, input of other instructions or messages, etc., wherein the touch pad 18 can be an optical type touch pad or a resistor/capacitor type touch pad.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. As one example, the video display host 40 is not limited to cooperating with only one remote controller 10; it can communicate in wireless manner with two or more remote controllers 10 simultaneously, as a platform for several users to play games or communicate with one another at the same time. As another example, in the foregoing description, it is implied that the three-dimensional information is generated solely by optical devices and relevant calculation; however, it can be thus designed that two-dimensional information is generated by optical devices and relevant calculation, while information of the third dimension is generated by a gyro-sensor or an acceleration sensor, or the like. In view of the foregoing, the spirit of the present invention should cover all such and other modifications and variations, which should be interpreted to fall within the scope of the following claims and their equivalents.

What is claimed is:

1. A remote controllable video display system, comprising:
   (1) a video display host;
   (2) a light source for emitting a light signal;
   (3) a remote controller movable three-dimensionally for generating control information, including:
      (3a) an optical sensor for sensing the light signal to detect a relative position of the optical sensor to the light source, and generating a first electronic signal representing positional information;
      (3b) a signal processing and transmitting device for receiving and processing the first electronic signal to transmit a first wireless signal; and
      (3c) a first button with a predetermined function; and
   (4) a receiver device coupled to the video display host, the receiver device receiving the first wireless signal and generating a second electronic signal which is inputted to the video display host,
   wherein when the first button is pressed or released, action information about the status of the first button (pressed or released) is outputted, but
      (i) the positional information is not outputted or not processed within a predetermined period of time, or
      (ii) the positional information is not outputted or not processed when the remote controller has an acceleration larger than a predetermined value.

2. The remote controllable video display system or claim 1, wherein the predetermined function is triggered by single-click, double-click, or multiple-click of the first button.

3. The remote controllable video display system of claim 1, wherein the remote controller outputs double-click or multiple-click action information when the first button is pressed once.

4. The remote controllable video display system of claim 1, wherein the predetermined period of time is counted from: (a) when the first button is first pressed, (b) when the first button is last pressed, or (c) when the first button is last released.

5. The remote controllable video display system of claim 2, wherein when the first button is kept in a pressed status, the remote controller keeps outputting multiple-click action information.

6. The remote controllable video display system of claim 1, wherein the remote controller further includes a second button, and when the second button is kept in a pressed status, the remote controller keeps outputting multiple-click action information.

7. The remote controllable video display system of claim 1, further comprising an infrared (IR) pass filter, wherein the light signal emitted by the light source is an infrared signal, and the optical sensor is controllable to receive the light signal through or not through the IR pass filter.

8. The remote controllable video display system of claim 1, wherein the remote controller further includes a microphone for receiving an audio signal; and an analog to digital converter for converting the audio signal to a third electronic signal which is inputted to the signal processing and transmitting device.

9. The remote controllable video display system of claim 8, wherein the audio signal controls the video display host for one or more of the following functions: power-on, power-off, channel switching, or volume adjustment.

10. The remote controllable video display system of claim 1, further comprising: a display device coupled to the video display host, wherein a controllable object shown in a graphic displayed on the display device is controlled by the control information generated by the remote controller.

11. The remote controllable video display system of claim 10, wherein the display device is a full HD resolution display device.

12. The remote controllable video display system of claim 1, wherein the receiver device is a first bi-directional transceiver device capable of transmitting a second wireless signal, and the signal processing and transmitting device is a second bi-directional transceiver device capable of receiving the second wireless signal.

13. The remote controllable video display system of claim 12, wherein the remote controller further includes a speaker for generating a sound converted from the second wireless signal, or a sound effect built in the remote controller.

14. The remote controllable video display system of claim 12, wherein the video display host is electrically connected to the Internet; and wherein the remote controller further includes a microphone for receiving an audio signal, and a speaker for generating a sound converted from the second wireless signal, such that the remote controller functions as an Internet phone.

15. The remote controllable video display system of claim 12, wherein the remote controller further includes a speaker, a light emitting device, or a vibrator, and the video display host includes a search button for searching the remote controller; wherein when the search button is pressed, the remote controller is controlled such that the speaker generates a sound, the light emitting device flashes, or the vibrator vibrates.

16. The remote controllable video display system of claim 15, wherein (1) the video display host is coupled to a display device, and when the remote controller is being searched, the display device displays relevant information, or (2) the video display host further includes an LED or a small size display to show relevant information when the remote controller is being searched.

17. The remote controllable video display system of claim 1, comprising at least two remote controllers, and the video display host is controllable by control information simultaneously generated by the at least two remote controllers.

18. The remote controllable video display system of claim 12, comprising at least two remote controllers, and the video display host transmits information simultaneously to the at least two remote controllers via the second wireless signal.

19. A remote controllable video display system, comprising:
   (1) a video display host;
   (2) a remote controller movable three-dimensionally for generating control information, including:
      (2a) a light source for emitting a light signal;

(2b) a signal processing and transmitting device for transmitting a first wireless signal; and (2c) a first button with a predetermined function;

(3) an optical sensor for sensing the light signal to detect a relative position of the optical sensor to the light source, and generating a first electronic signal representing positional information; and (4) a receiver device coupled to the video display host, the receiver device receiving the first electronic signal and the first wireless signal, and generating a second electronic signal which is inputted to the video display host, wherein when the first button is pressed or released, action information about the status of the first button (pressed or released) is outputted, but (i) the positional information is not outputted or not processed within a predetermined period of time, or (ii) the positional information is not outputted or not processed when the remote controller has an acceleration larger than a predetermined value.

20. The remote controllable video display system of claim 19, wherein the predetermined function is triggered by single-click, double-click, or multiple-click of the first button.

21. The remote controllable video display system of claim 19, wherein the remote controller outputs double-click or multiple-click action information when the first button is pressed once.

22. The remote controllable video display system of claim 19, wherein the predetermined period of time is counted from: (a) when the first button is first pressed, (b) when the first button is last pressed, or (c) when the first button is last released.

23. The remote controllable video display system of claim 20, wherein when the first button is kept in a pressed status, the remote controller keeps outputting multiple-click action information.

24. The remote controllable video display system of claim 19, wherein the remote controller further includes a second button, and when the second button is kept in a pressed status, the remote controller keeps outputting multiple-click action information.

25. The remote controllable video display system of claim 19, further comprising an infrared (IR) pass filter, wherein the light signal emitted by the light source is an infrared signal, and the optical sensor is controllable to receive the light signal through or not through the IR pass filter.

26. The remote controllable video display system of claim 19, wherein the remote controller further includes a microphone for receiving an audio signal; and an analog to digital converter for converting the audio signal to a third electronic signal which is inputted to the signal processing and transmitting device.

27. The remote controllable video display system of claim 26, wherein the audio signal controls the video display host for one or more of the following functions: power-on, power-off, channel switching, or volume adjustment.

28. The remote controllable video display system of claim 19, further comprising: a display device coupled to the video display host, wherein a controllable object shown in a graphic displayed on the display device is controlled by the control information generated by the remote controller.

29. The remote controllable video display system, of claim 28, wherein the display device is a full HD resolution display device.

30. The remote controllable video display system of claim 19, wherein the receiver device is a first bi-directional transceiver device capable of transmitting a second wireless signal, and the signal processing and transmitting device is a second bi-directional transceiver device capable of receiving the second wireless signal.

31. The remote controllable video display system of claim 30, wherein the remote controller further includes a speaker for generating a sound converted from the second wireless signal, or a sound effect built in the remote controller.

32. The remote controllable video display system of claim 30, wherein the video display host is electrically connected to the Internet; and wherein the remote controller further includes a microphone for receiving an audio signal, and a speaker for generating a sound converted from the second wireless signal, such that the remote controller functions as an Internet phone.

33. The remote controllable video display system of claim 30, wherein the remote controller further includes a speaker, a light emitting device, or a vibrator, and the video display host includes a search button for searching the remote controller; wherein when the search button, is pressed, the remote controller is controlled such that the speaker generates a sound, the light emitting device flashes, or the vibrator vibrates.

34. The remote controllable video display system of claim 33, wherein (1) the video display host is coupled to a display device, and when the remote controller is being searched, the display device displays relevant information, or (2) the video display host further includes an LED or a small size display to show relevant information when the remote controller is being searched.

35. The remote controllable video display system of claim 19, comprising at least two remote controllers, and the video display host is controllable by control information simultaneously generated by the at least two remote controllers.

36. The remote controllable video display system of claim 30, comprising at least two remote controllers, and the video display host transmits information simultaneously to the at least two remote controllers via the second wireless signal.

37. A remote controller for a remote controllable video display system, which is movable three-dimensionally to generate control information for remote controlling a video display host, the remote controller comprising:

(1) an optical sensor for sensing a light signal from a light source to detect a relative position of the remote controller to the light source, and generating a first electronic signal representing positional information;

(2) a signal processing and transmitting device for receiving and processing the first electronic signal to transmit a first wireless signal; and (3) a first button with a predetermined function, wherein when the first button is pressed or released, action information about the status of the first button (pressed or released) is outputted, but (i) the positional information is not outputted or not processed within a predetermined period of time, or (ii) the positional information is not outputted or not processed when the remote controller has an acceleration larger than a predetermined value.

38. The remote controller of claim 37, wherein when the first button is kept in a pressed status, the remote controller keeps outputting multiple-click action information.

39. The remote controller of claim 37, further comprising a second button, and when the second button is kept in a pressed status, the remote controller keeps outputting multiple-click action information.

40. The remote controller of claim 37, further comprising an infrared (IR) pass filter, wherein the light signal emitted by the light source is an infrared signal, and the optical sensor is controllable to receive the light signal through or not through the IR pass filter.

41. The remote controller of claim 40, wherein the IR pass filter is a high pass filter letting through only IR signals but blocking other light signals, or a band pass filter letting through only light signals having the same wavelength as the light source but blocking other light signals.

42. The remote controller of claim 37, further comprising: a microphone for receiving an audio signal, and an analog to digital converter for converting the audio signal to a third electronic signal which is inputted to the signal processing and transmitting device.

43. The remote controller of claim 42, wherein the audio signal controls the video display host for one or more of the following functions: power-on, power-off, channel switching, or volume adjustment.

44. The remote controller of claim 37, wherein the signal processing and transmitting device is a bi-directional transceiver device for receiving a second wireless signal from an external source.

45. The remote controller of claim 44, further comprising a speaker for generating a sound converted from the second wireless signal, or a sound effect built in the remote controller.

46. The remote controller of claim 37, further comprising a display coupled to the signal processing and transmitting device for displaying predetermined information.

47. The remote controller of claim 37, further comprising a touch pad device coupled to the signal processing and transmitting device for handwriting input or cursor control.

48. A method for remote controlling a video display system, comprising:
    emitting a light signal from a first remote end;
    sensing the light signal from a second remote end for detecting a relative position of the first remote end to the second remote end, and generating a first electronic signal representing positional information;
    moving one of the first and the second remote ends three-dimensionally, to change the positional information and generate control information for controlling a video display host;
    providing a button with a predetermined function on one of the first and second remote ends which is being moved three-dimensionally; and
    outputting action information about a status of the button when the button is pressed or released, but
    (i) stopping generating the positional information or stopping controlling the video display host by the positional information within a predetermined period of time, or
    (ii) stopping generating the positional information or stopping controlling the video display host by the positional information, when one of the first or second remote ends which is being moved has an acceleration larger than a predetermined value.

49. The method of claim 48, wherein the light signal is an infrared signal, the method further comprising:
    sensing a general image and transmitting the general image to the video display host.

50. The method of claim 48, further comprising:
    transmitting an audio signal to one of the first and second remote ends which is being moved three-dimensionally, and
    controlling the video display host according to the audio signal.

51. The method of claim 48, further comprising:
    transmitting an audio signal from the video display host to one of the first and second remote ends which is being moved three-dimensionally, and
    generating a sound according to the audio signal from one of the first remote end and the second remote ends which is being moved three-dimensionally.

52. The method of claim 48, wherein the video display host is coupled to a display device, and the method further comprising: controlling a controllable object shown in a graphic displayed on the display device by the control information.

53. The method of claim 48, further comprising:
    transmitting a search signal from the video display host to one of the first and second remote ends which is being moved three-dimensionally, and
    generating a response to the search signal from one of the first and second remote ends which is being moved three-dimensionally.

54. The method of claim 48, further comprising:
    generating action information of double-click or multiple-click when the button is pressed.

* * * * *